US007917157B2

(12) United States Patent
Muhonen

(10) Patent No.: US 7,917,157 B2
(45) Date of Patent: Mar. 29, 2011

(54) LOCATION SERVICES FOR MOBILE COMMUNICATION SYSTEM

(75) Inventor: Janne Muhonen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/522,951

(22) PCT Filed: Jul. 22, 2003

(86) PCT No.: PCT/IB03/03346
§ 371 (c)(1),
(2), (4) Date: Mar. 7, 2005

(87) PCT Pub. No.: WO2004/016027
PCT Pub. Date: Feb. 19, 2004

(65) Prior Publication Data
US 2006/0128395 A1    Jun. 15, 2006

(30) Foreign Application Priority Data
Aug. 2, 2002  (GB) .................................. 0218028.9

(51) Int. Cl.
H04W 24/00     (2009.01)
H04M 11/04     (2006.01)
H04M 3/42      (2006.01)
H04M 3/493     (2006.01)
H04L 29/06     (2006.01)
G01S 3/02      (2006.01)
G01C 21/00     (2006.01)

(52) U.S. Cl. ............... 455/456.2; 455/404.2; 455/414.2; 455/414.3; 455/456.1; 455/456.3; 342/455; 342/457; 701/207

(58) Field of Classification Search .................. 455/458, 455/456, 38.1, 432, 435, 422, 515, 516, 455, 455/464, 456.1–457, 404.2, 414.2–414.3; 342/455, 457; 701/207
See application file for complete search history.

(56) References Cited

U.S. PATENT DOCUMENTS

| 6,023,624 | A  | * | 2/2000 | Hanson .......................... 455/458 |
| 6,035,203 | A  |   | 3/2000 | Hanson |
| 6,058,308 | A  | * | 5/2000 | Kallin et al. ................ 455/432.3 |
| 6,169,899 | B1 |   | 1/2001 | Havinis et al. |

(Continued)

FOREIGN PATENT DOCUMENTS

EP    1 349 411 A1   10/2003
WO    WO 02/35752 A2   5/2002

OTHER PUBLICATIONS (3GPP) 3G TS 22.105, Services and Service Capabilities, Apr. 1999, pp. 1-28.
(3GPP) 3G TS 22.071, Location Services (LCS), Dec. 1999, pp. 1-25.

Primary Examiner — Huy Phan
Assistant Examiner — Munsoon Choo
(74) Attorney, Agent, or Firm — Squire, Sanders & Dempsey (US)LLP

(57) ABSTRACT

There is disclosed a method of providing location information in a mobile communication system, comprising the steps of: receiving a request for a current location of a mobile station; determining a time at which a last known location of the mobile station was determined; comparing the time to a threshold time limit; and providing, as the current location, the last known location if the time is within the threshold time limit.

41 Claims, 5 Drawing Sheets

U.S. PATENT DOCUMENTS

| | | | |
|---|---|---|---|
| 6,181,945 B1 * | 1/2001 | Lee | 340/7.21 |
| 6,377,791 B1 * | 4/2002 | Pirila | 455/410 |
| 6,385,452 B1 | 5/2002 | Zadeh et al. | |
| 7,133,909 B2 * | 11/2006 | Bahl | 709/223 |
| 2001/0006892 A1 * | 7/2001 | Barnett et al. | 455/434 |
| 2003/0008672 A1 * | 1/2003 | Fujii | 455/456 |

* cited by examiner

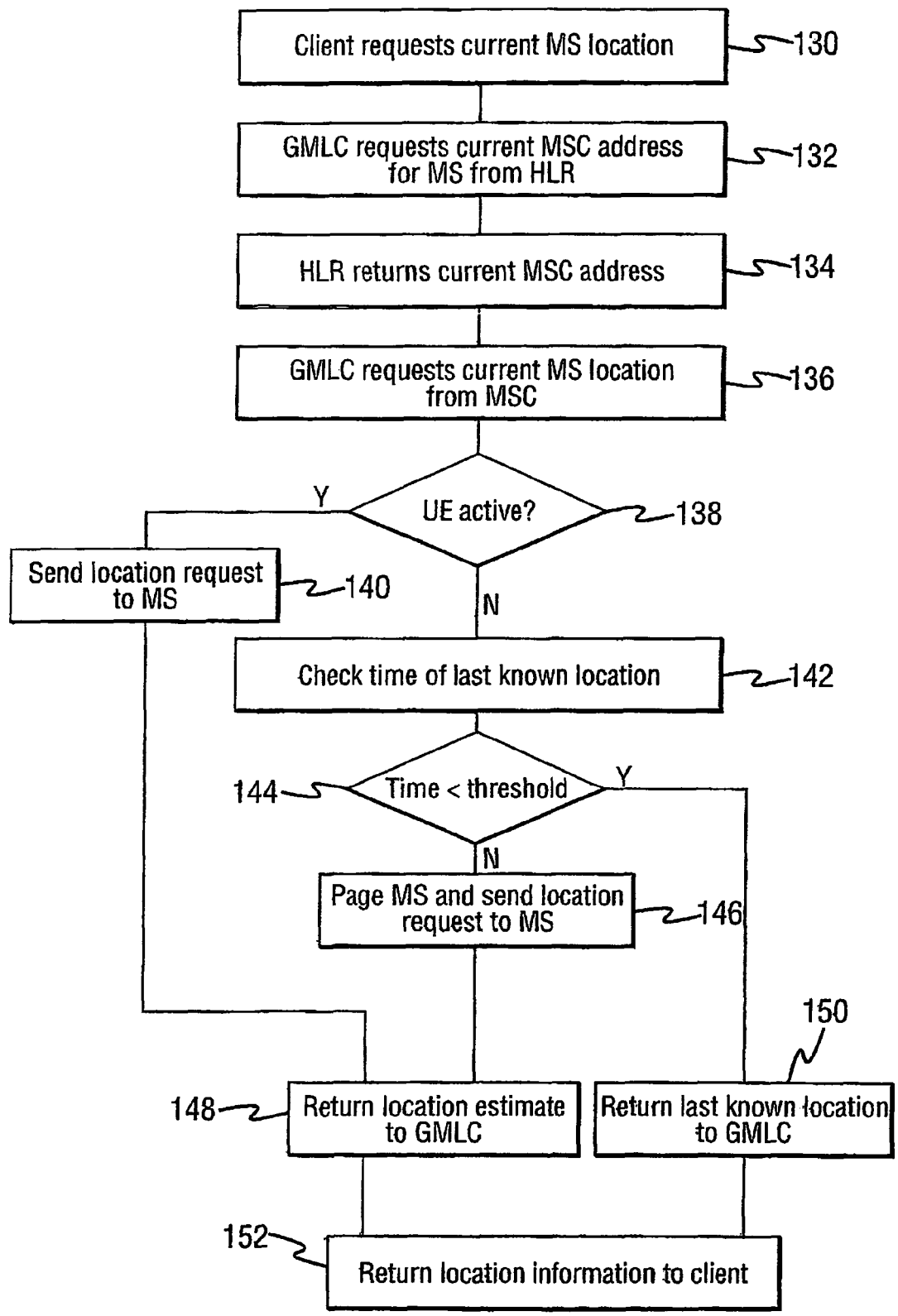

LOCATION SERVICES FOR MOBILE COMMUNICATION SYSTEM

FIELD OF THE INVENTION

The present invention relates to the provision of location information in mobile communication networks, and particularly in applications where a request is made for a current location of a mobile device. The invention is particularly but not exclusively concerned with location based services in second and third generation mobile communication systems.

BACKGROUND OF THE INVENTION

In mobile communication systems, network operators are always concerned about radio resource usage. There is a general aim to optimise radio resource usage.

The provision of location services in mobile communication services, which is likely to be a key service aspect of future mobile communication systems, adds an additional burden to radio resources, since with current techniques there is a need for additional radio signals to provide information relating to a current location of a mobile station. In particular, in current proposals for location services there is a requirement for mobile stations which are in idle mode to be paged in order to obtain there location responsive to a paging request.

In customised applications for mobile network enhanced logic (CAMEL) phase 1 and phase 2, if a mobile station is active then the active session is used to identify a current cell global identity (CGI) or service area identity (SAI) for the mobile station. Additionally in CAMEL phase 2 if the mobile station is idle, then the last known location for the mobile station is returned. However, the last known location for the mobile station in idle mode may no longer provide useful information if the mobile station has moved significantly since its last known location was recorded.

In CAMEL phase 3, if a mobile station is active then the active session is again used to identify a current location of the mobile station, either the cell global identity (CGI) of GSM radio access network or service area identity (SAI) of UMTS radio access network. If the mobile station is idle, however, then the idle mobile station may be paged in order to obtain updated location information. The mobile station is paged if the current location is requested. This provides more useful location information in idle mode, but increases the radio resource usage.

In third generation based location services, as with CAMEL phase 3, if a mobile station is idle it is always paged and a location request issued to it again increasing the radio resource usage. Standard LCS functionality differs from CAMEL phase 3 in that paging is always done for an idle mode mobile station.

It is an aim of embodiments of the present invention to facilitate location services whilst minimising any usage of radio resources, and thereby minimise one or all of the problems mentioned above.

SUMMARY OF THE INVENTION

According to the present invention there is provided a method of providing location information in a mobile communication system, comprising the steps of: receiving a request for a current location of a mobile station; determining a time at which a last known location of the mobile station was determined; comparing the time to a threshold time limit; and providing, as the current location, the last known location if the time is within the threshold time limit.

The method may further comprise the steps of: determining a current location of the mobile station if the time is not within the threshold limit; and providing, as the current location, the obtained current location.

The step of comparing the time to the threshold time limit may be dependent upon the status of the mobile station. If the mobile station is active the comparing step may be disabled and a current location is determined for the mobile station. If the status of the mobile station is idle, the comparing step may be enabled.

If a current location is not provided, the last known location may be provided as the current location.

The method according may further comprise the step of storing the last known location of a mobile station together with a time associated with the last known location. The method may further comprise the step of storing the threshold time limit. The method may further comprise the step of dynamically adjusting the threshold time limit.

The threshold time limit may be set by a network operator. The threshold limit may be included in the request for the current location. The time may be an elapsed time.

According to the present invention there is further provided a method of providing location information in a mobile communication system, comprising the steps of: receiving at a network element a request from an application for a current location of a mobile station; determining, at the network element, a time at which a last known location of the mobile station was determined; comparing, at the network element, the time to a threshold time limit; and providing to the application, as the current location, the last known location if the time is within the threshold time limit.

According to the present invention there is still further provided a network element for providing location information in a mobile communication system, comprising: means for receiving a request for a current location of a mobile station; means for determining a time at which a last known location of the mobile station was determined; means for comparing the time to a threshold time limit; and means for providing, as the current location, the last known location if the time is within the threshold time limit.

The network element may further comprise means for determining a current location for the mobile station if the time is not within the threshold limit; wherein the means for providing is adapted to provide, as the current location, the obtained current location.

The means for comparing the time to the threshold time limit may be responsive to a signal indicating the status of the mobile station. Responsive to said signal indicating that the mobile station is active the comparing means may be disabled and a current location is determined for the mobile station. Responsive to said signal indicating that the mobile station is idle, the comparing means may be enabled.

If a current location is not provided, the network element may be adapted to provide the last known location is provided as the current location. The network element may further comprise means for storing the last known location of a mobile station together with a time associated with the last known location.

The network element may further comprise means for storing the threshold time limit. The network element may further comprise means for dynamically adjusting the threshold time limit. The threshold time limit may be set by a network operator. The threshold time limit may be included in the request for a current location.

According to a yet further aspect of the present invention there is provided a mobile communication system including an application for providing location dependent services and for generating a location request for a user equipment; a network element for receiving the request for a current location of a mobile station; a network element for determining a time at which a last known location of the mobile station was determined and for comparing the time to a threshold time limit; and a network element for providing, as the current location, the last known location if the time is within the threshold time limit.

The network element for determining the time at which the last known location was determined preferably includes a visitor location register. The system may implement a CAMEL framework or location services.

In embodiments, the invention thus proposes a configurable threshold for an MSC/VLR (or SGSN) which prevents unnecessary paging attempts if the MSC/VLR (or SGSN) already has sufficiently fresh location information available. For the purposes of both CAMEL any time interrogation (ATI) and location services (LCS), the VLR stores the last known location information for each subscriber. The threshold value is used such that no paging is needed if the last known location information is newer than the threshold value, which value is set by the system operator.

Whilst the invention is particularly advantageously utilised for mobile stations in idle mode, the inventive technique may also be applied to mobile stations in active mode.

BRIEF DESCRIPTION OF THE DRAWINGS

The invention will now be described by way of example with reference to the accompanying drawings in which:

FIG. 5 is a flow diagram illustrating the steps for implementing a preferred embodiment of the invention in the communication system of FIG. 4.

DESCRIPTION OF PREFERRED EMBODIMENTS

The present invention is described herein by way of particular reference to exemplary embodiments. The invention is not limited in its applicability to any particular example described herein. The invention is particularly described in relation to a CAMEL (customised applications for mobile network enhanced logic) framework and a location services framework. However such frameworks are presented merely for ease of understanding the present invention.

Figure 1:
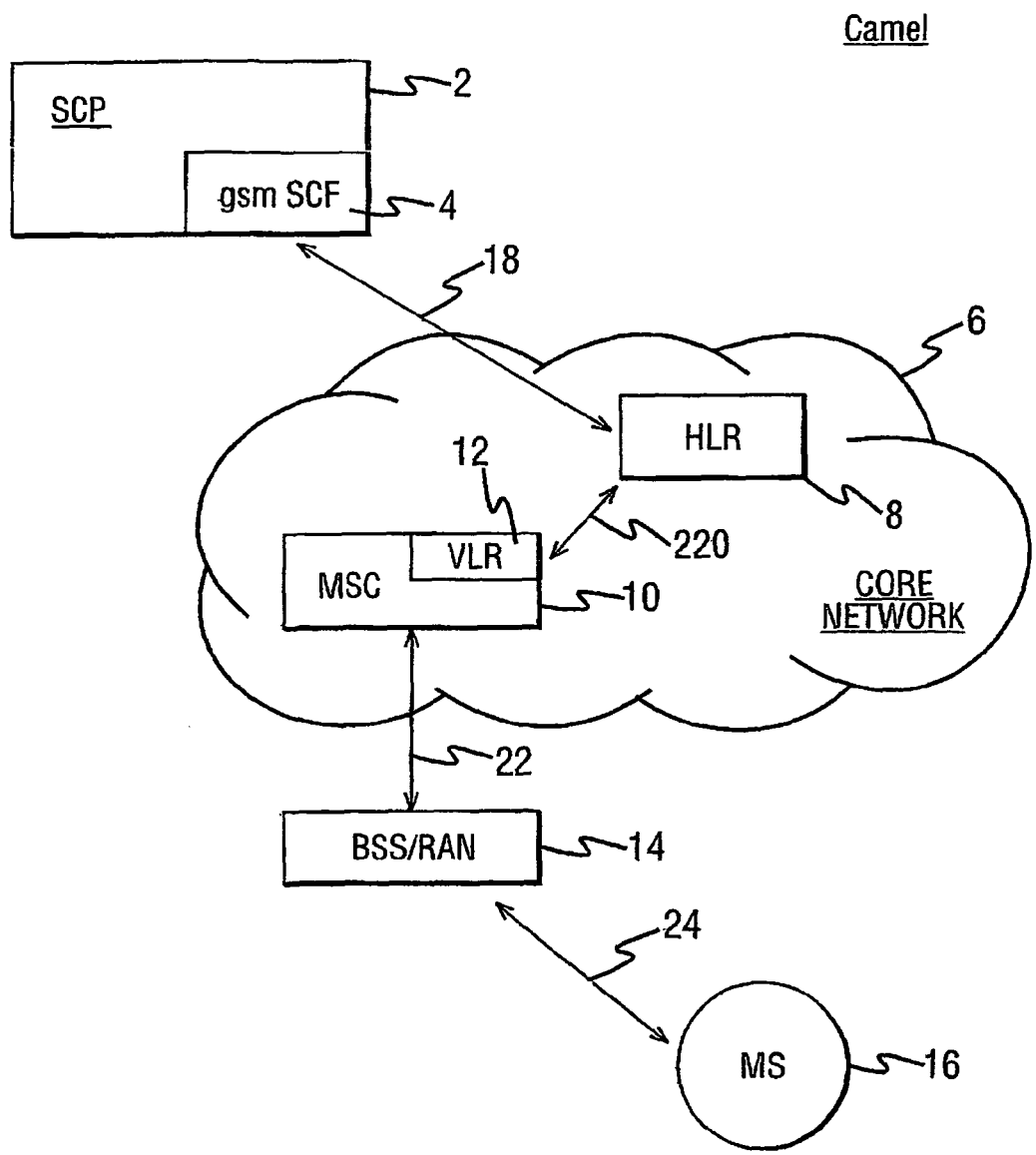
FIG. 1 illustrates an example of a CAMEL based mobile communication system in which an embodiment of the invention may be implemented.

Referring to FIG. 1, the invention is first described with reference to a CAMEL phase 3 framework. FIG. 1 shows the main elements necessary in order to describe the application of the present invention in a CAMEL phase 3 implementation. Only such elements of the implementation are shown which are necessary for an understanding of the present invention.

Referring to FIG. 1, there is shown a core network 6 including a home location register (HLR) 8 and a mobile-services switching centre (MSC) 10. The mobile-services switching centre 10 is associated with a visitor location register (VLR) 12. External to the core network 6, there is illustrated a service control point (SCP) 2. The service control point 2 is associated with a GSM service control function (gsmSCF) 4. The gsmSCF in FIG. 1 is shown only by way of example, and the functional entity gsmSCF may be implemented as part of any other network element. A base station sub system or radio access network (BSS/RAN) 14 comprises the interface between the core network 6 and mobile stations, one of which mobile stations is represented by mobile station (MS) 16. Although a mobile station is shown in the Figures, this is for the purposes of describing examples, and the mobile station may be more generally considered to be user equipment.

The elements illustrated in FIG. 1 are familiar to one skilled in the art. The service control point 2 is the network element implementing the gsmSCF functionality. The gsmSCF 4 is the functional entity that contains the CAMEL service logic to implement operator specific services. The present invention is particularly concerned with the provision of location based information. Therefore the elements of FIG. 1 represent those elements of the core network 6 required for implementation of such.

The CAMEL phase 3 arrangement of FIG. 1 will now be described by way of reference to FIGS. 2 and 3, utilising the present invention. The gsmSCF 4 requests the location of the mobile station 16 by sending a MAP any time interrogation (ATI) message to the HLR 8. This request is sent on a signal line 18 from the gsmSCF 4 to the HLR 8. The request received by the HLR 8 identifies the mobile station 16. The HLR 8 stores the identity of the VLR in which the mobile station 16 is currently registered. The HLR 8 stores also the identity of the mobile-services switching centre 10. On determining the appropriate identity, the HLR 8 sends the location request to the VLR 12 via communication link 20.

Figure 2:
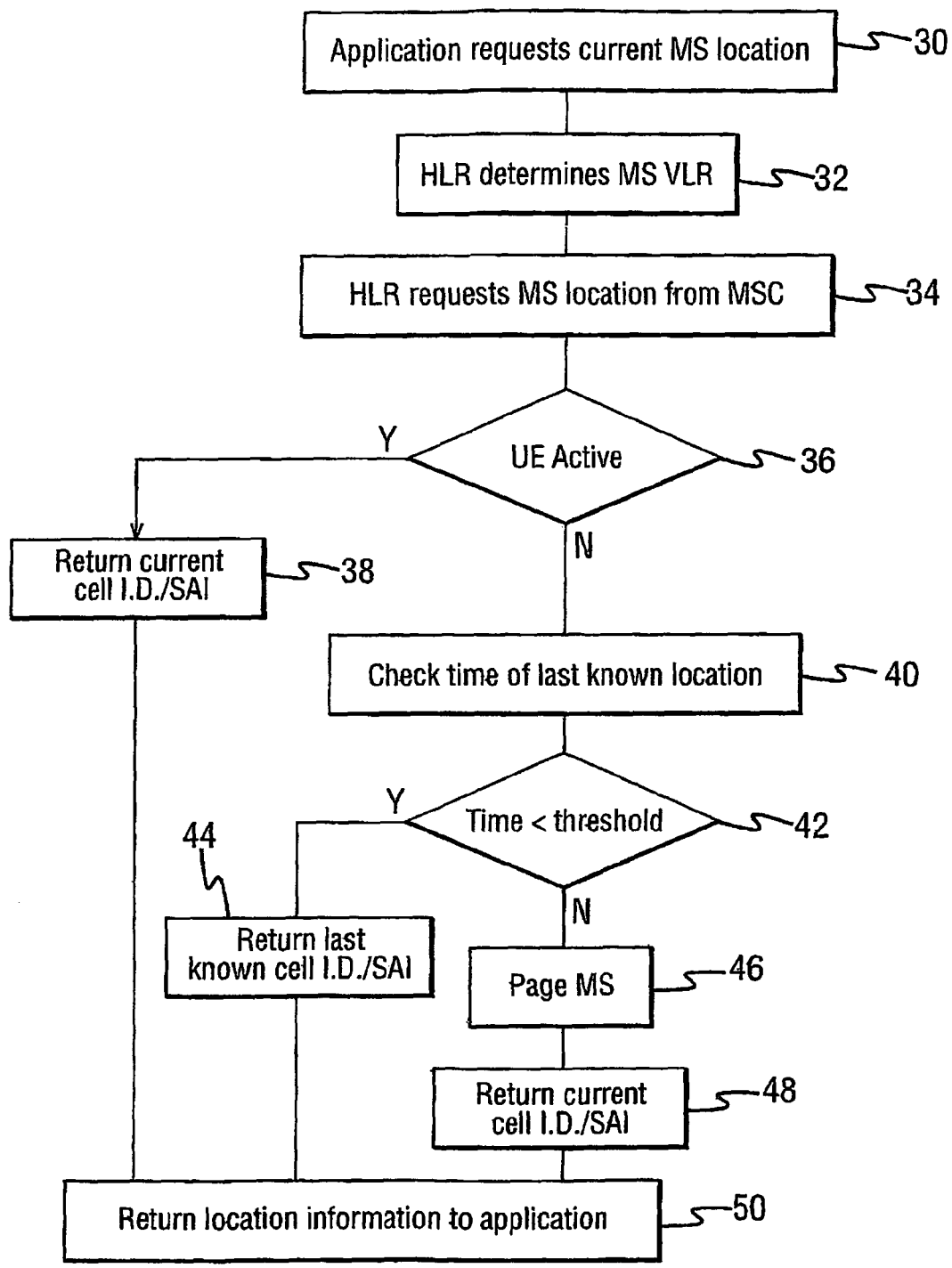
FIG. 2 is a flow diagram illustrating the steps for implementing a preferred embodiment of the invention in the communication system of FIG. 1.

The preceding actions are represented by steps 30, 32, and 34 in FIG. 2. In step 30 the application, i.e. the gsmSCF 4, requests the current MS location. In step 32 the HLR 8 determines the VLR 12 associated with the mobile station. In step 34 the HLR request the MS location from the VLR 12.

In a step 36 the visitor location register 12 and mobile-services switching centre 10 determines whether the user equipment, i.e. the mobile station 16, is currently active. If the mobile station 16 is currently active, then the location of the mobile station is known due to the active call connection. Thus in a step 38 the mobile-services switching centre returns the current cell global identity (CGI) or service area identity (SAI) to the HLR 8 via the communication link 20.

If in step 36 it is determined that the mobile station is not active, i.e. it is in idle mode, then the MSC 10 determines the time of the last known location in a step 40. The VLR 12 stores the last known location of each mobile station, together with the time at which that location was determined. In accordance with the present invention, in a step 42 the time at which the last known location for the mobile station was determined is compared to a threshold value. For example, based on the current time the time elapsed since the last known location was determined may be calculated, and the threshold time may be a value of elapsed time. As is discussed further hereinbelow, the threshold time is preferably set by the operator of the network.

The threshold time is intended to be a representation of the "freshness" of the last known location. For example, for a given application it may be acceptable if the location information is less than a certain time period old. For example certain location services may only require that the location information is provided within a 30 second window. In such cases, the threshold value will be set at a 30 second time period. Further discussion in relation to the setting of the threshold value is given hereinbelow.

If in the step 42 it is determined that the elapsed time is less than the threshold time, then in step 44 the last known CGI or service area identity is returned to the HLR 8 on communication link 20.

If however in step 42 it is determined that the elapsed time since the last known location was determined is greater than the threshold value, then in a step 46 the mobile station is paged through the BSS/RAN 14. The MSC 10 communicates with the BSS/RAN 14 via communication links 22. The BSS/RAN 14 sends a paging signal to the mobile station 16 on the air interface communication link 24. Responsive to the paging signal, the mobile station 16 sends a signal to the BSS/RAN 14 via the air interface communication link 24, which in turn is forwarded to the mobile-services switching centre 10 via the communication link 22. Following the response from the mobile station 16, the CGI or service area identity of the mobile station 16 is known, and in a step 48 the current CGI or service area identity is returned to the HLR 8.

After return of the current CGI or service area identity in any one of steps 38, 44 or 48, the location information is returned to the application gsmSCF 4 via communication link 18 from the HLR 8.

Thus, as can be seen from the above description, the present invention advantageously uses a threshold value in order to determine when the mobile station should be paged in order to determine its location. Thus, contrary to prior art techniques, an idle mobile station is not paged responsive to every location request. However, the mobile station is paged if it is determined that the last stored location information is too old.

The value of the threshold is determined preferably by the operator of the network. The threshold value may be dynamically variable, in dependence upon network conditions or operator requirements. The application itself may also indicate to the threshold value that it tolerates. The application may send a threshold value with a location request.

The value of the threshold may also vary in dependence upon an accuracy required. For example, if the application required to know the location of the mobile station within an accuracy of 1 km, then a large threshold time may be tolerable. However if accuracy was required to be within 100 m, then a small threshold value may only be tolerable. Requested accuracy can be indicated currently only within location services procedure, not in CAMEL ATI. An example implementation of the invention using location services is given hereinbelow.

The threshold value may also be dynamically adjustable in dependence upon the characteristics of the mobile station. For example if it is know that the mobile station is fast moving, then the threshold value may only be a small value.

In the above described example, in the case where the mobile station is currently active then the threshold value is not used. However, it may be advantageous to use the threshold value in a similar way for actively connected mobile stations. This is discussed further hereinbelow with reference to a different embodiment.

Figure 3:
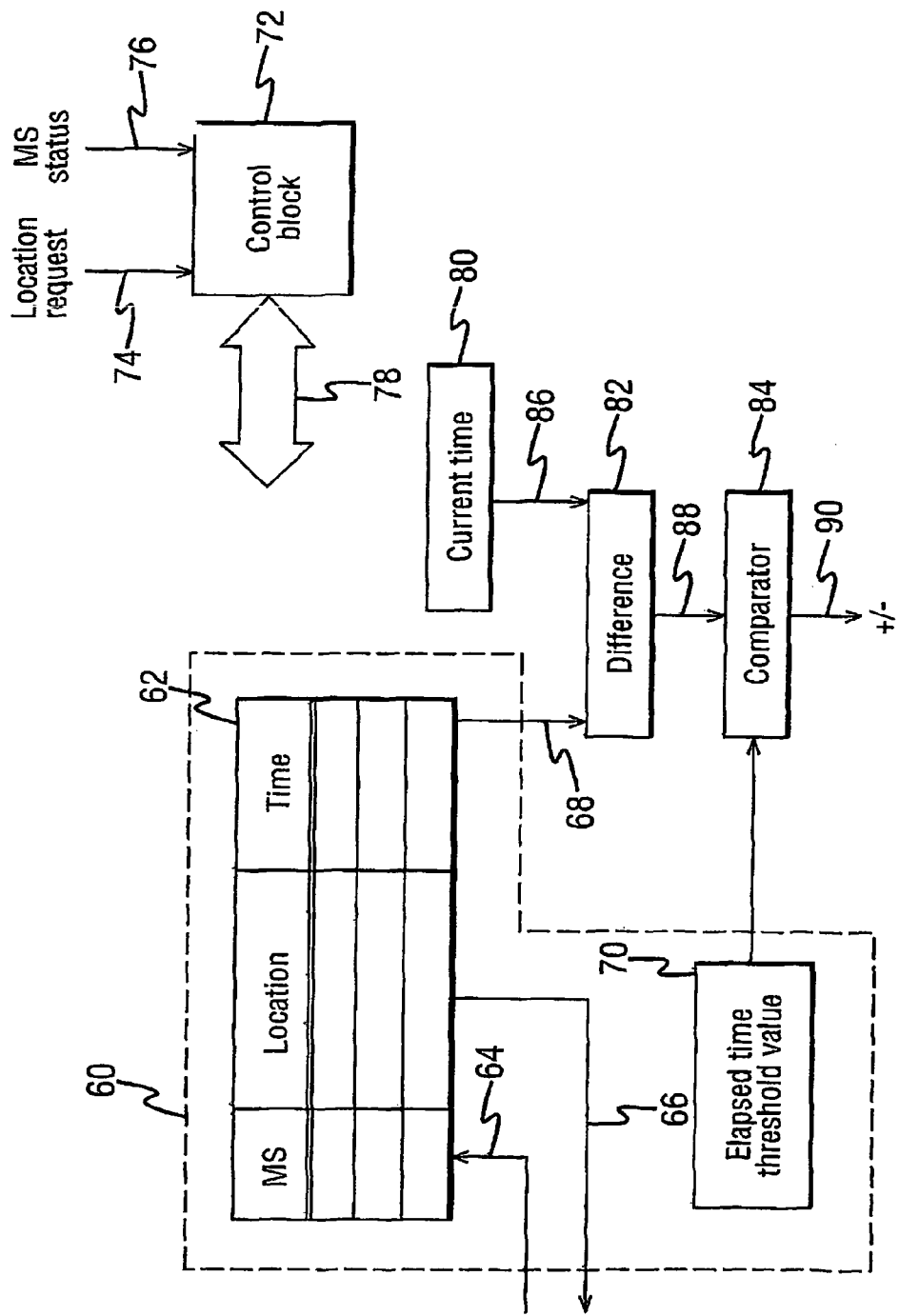
FIG. 3 illustrates the main features of a network element adapted to implement a preferred embodiment of the present invention.

Referring to FIG. 3, there is illustrated elements of an exemplary visitor location register 12 and mobile-services switching centre 10 for implementing a preferred embodiment of the present invention. It should be noted that the elements shown in FIG. 3 are for illustrative purposes only and do not necessarily represent elements which are essential to the implementation of the present invention. One skilled in the art will appreciate alternative implementations of the present invention. It should also be noted that in FIG. 3 there is some overlap between functional elements of the mobile-services switching centre 10 and the associated visitor location register 12.

Referring to FIG. 3, the mobile-services switching centre or visitor location register includes a control block 72, a difference calculator block 82, a comparator block 84, a current time block (or clock) 80, and a storage means 60. The storage means 60 includes the visitor location register reference 62 in FIG. 3, and an elapsed time special value storage element 70.

The control block 72 receives a location request 74 on the communication link 20 from the HLR 8. The control block 72 also receives a signal on line 76 indicating the status of the mobile station, i.e. idle or active. The control block 72 is provided with a communication interface 78 for communicating with the various other elements of the mobile-services switching centre and visitor location register 12. The current time block 80 provides a current time on line 86 to the difference calculator 82. The visitor location register 62 receives on a line 64 an identity of a mobile station. Responsive to the identity of the mobile station on line 64, in conjunction with appropriate control signals from the control block 72 on lines 78, the time of the last known location of the mobile station is read out on line 68 and provides a second input to the difference calculator 82.

In this preferred embodiment, the difference calculator subtracts the time at which the last known location was determined from the current time, in order to determine an elapsed time. The elapsed time is output from the difference calculator on line 88, and forms a first input to the comparator 84. A second input to the comparator 84 is provided by an elapsed time threshold value storage means 70 within the storage means 60. The comparator determines whether the elapsed time on line 88 is less than or greater than the threshold value stored in the storage means 70. The output on line 90 of the comparator 84 therefore simply gives an indication of whether the comparison is negative or positive.

The threshold indication on line 90 is provided to the control block as one of the control signals 78.

If in the comparator 84 it is determined that the elapsed time threshold value has not been exceeded, then the control block 72 controls the visited location register 62 to read out the last known location on a line 66 which is returned to the HLR 8. If in fact the threshold value has been exceeded, then as described hereinabove with reference to FIGS. 1 and 2 of the control block 72 initiates a paging of the mobile station in accordance with known techniques.

Figure 4:
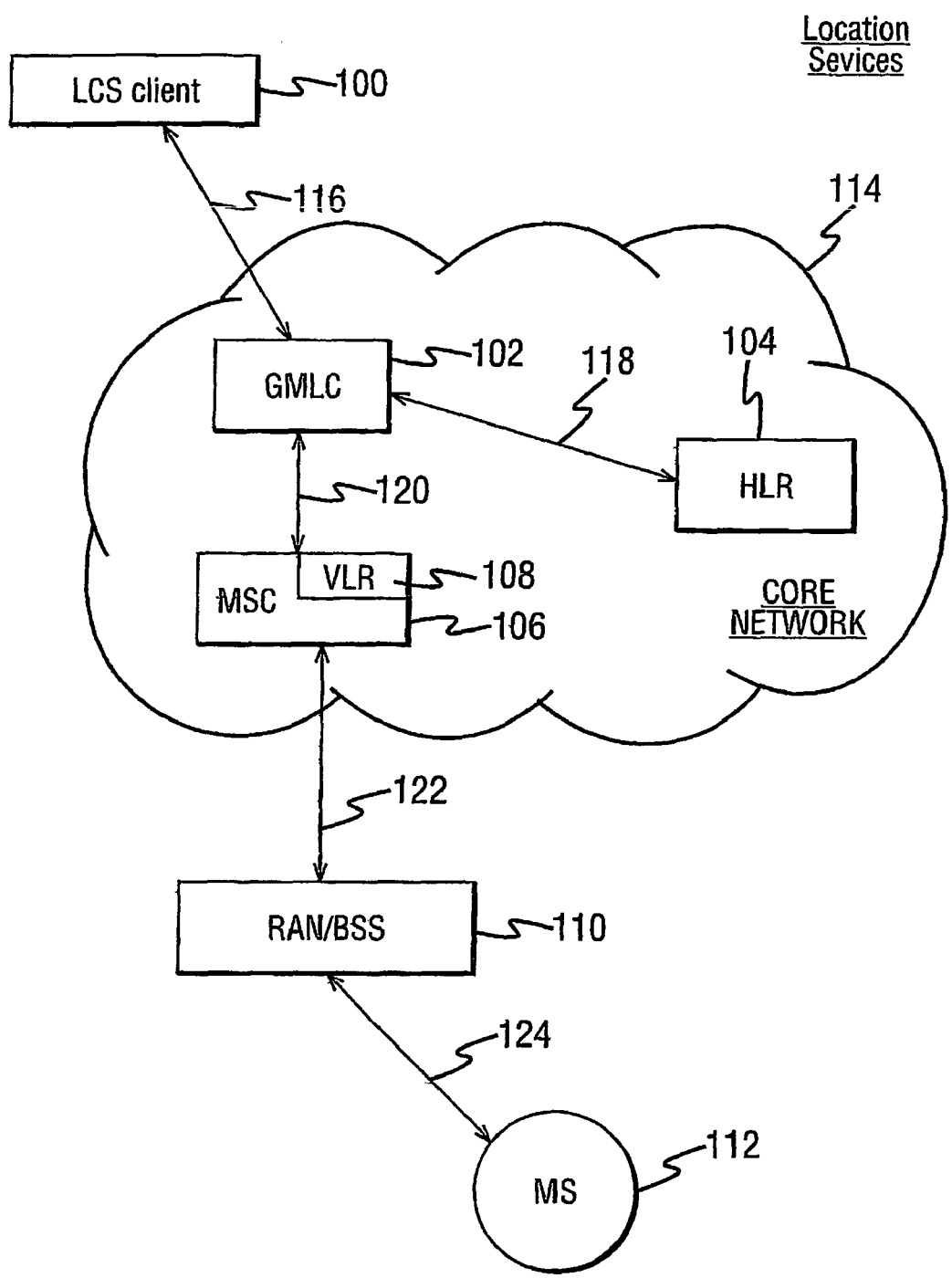
FIG. 4 illustrates a further example of a mobile communication system implementing location services in which an embodiment of the invention may be implemented.

A second embodiment of the present invention is now described with reference to FIGS. 4 and 5. FIG. 4 represents the network elements in a mobile communication system implementing location services. Referring to FIG. 4, a core network 114 comprises a gateway mobile location centre (GMLC) 102, a home location register (HLR) 104, a mobile-services switching centre (MSC) 106 including a visitor location register 108. The mobile-services switching centre 106 is associated with the radio access network (RAN) or base station sub system (BSS) 110, which interfaces with the mobile station 112. A location services (LCS) client represents an application which may request the location of the mobile station 112. The location services client 100 communicates with the GMLC 102 of the core network via communication links 116. The GMLC 102 communicates with the HLR 104 via communication links 118. The GMLC connects with the MSC 106 via communication links 120. The MSC 106 communicates with the RAN/BSS 110 via communication links 122. The RAN/BSS 110 communicates with the mobile station 112 via air interface communication links 124.

The operation of the location services implementation of FIG. 4 for requesting location of the mobile station 112 in accordance with the present invention will be further described hereinbelow with reference to FIG. 5.

With reference to FIG. 5, in a step 130 a client, such as LCS client 100, requests a current MS location by transmitting a request on communication link 116 to the GMLC 102. Responsive thereto, the GMLC 102 requests a current MSC address for the mobile station from the HLR 104 on communication link 118, as represented by step 132. The HLR 104 then returns the current MSC address, in step 134, on communication link 118 to the GMLC 102. The GMLC then requests the current MS location from the MSC 106, on communication link 120, as represented by step 136.

Thereafter, in a step 138, the mobile-services switching centre 106 determines whether the mobile station 112 is currently active. If the mobile station 112 is currently active, then in a step 140 the mobile-services switching centre 106 sends a location request to the RAN/BSS 110 using existing communication link 122. Paging is not required, as the radio link is already established. After receiving the location request the RAN/BSS determines the location estimate of the mobile station using conventional techniques, which may involve signalling between the RAN/BSS 110 and the mobile station 112 over the air-interface 124.

If it is determined in step 138 that the mobile station is not active, i.e. it is in idle mode, then the mobile-services switching centre 106 retrieves the last known location of the mobile station from the visitor location register 108. In doing so, the mobile-services switching centre also retrieves the time of the last known location determination for the mobile station 112. This is represented by step 142 in FIG. 5.

In a step 144, the mobile-services switching centre 106 then determines whether the time associated with the last known location is less than the stored threshold value. If the time is less than the stored threshold value, then in step 150 the last known location is returned to the GMLC 102 on communication links 120.

If in step 144 it is determined that the time of the last known location exceeds the threshold value, then in a step 146 the mobile station is paged. Thereafter, a location request is sent to the RAN/BSS 110. The paging is sent to the mobile station 112 via the RAN/BSS 110. Responsive to the location request, the RAN/BSS determines the location estimate of the mobile station using conventional techniques, which may involve signalling between the RAN/BSS 110 and the mobile station 112 over the air-interface 124. Then the RAN/BSS 110 returns the estimated geographical coordinate position of the mobile station to the mobile-services switching centre 106 on lines 122.

Thereafter, in a step 148, the MSC 106 returns the location estimate to the GMLC 102.

After each of steps 148 and 150, the location information is returned to the LCS client 100 by the GMLC.

As discussed hereinabove, the use of the threshold value may also be used in relation to mobile stations which are currently active. In the embodiment of FIG. 4, such use of the threshold value may be advantageous. If an already determined and stored location information can be used, then this may save radio resources in having to save a further location request to the mobile station on the radio access network.

Thus there has been described a new technique for handling location requests in mobile communication systems. It is an essential part of the present invention that the technique is implemented responsive to a location request. It is also an important part of the present invention that the threshold level is preferably dynamically changeable, and that the operator sets the threshold level in the mobile-services switching centre 106 or visitor location register 108. One possible application is that the LCS client 100 or gsmSCF 4 provides the threshold level as part of location request data.

The invention has been described herein by way of reference to two specific examples. However the invention is not limited to any aspects of either of these examples. One skilled in the art will appreciate how the invention may be modified and applied in different implementations. The scope of the invention is defined by the impended claims.

The invention claimed is:

1. A method in a wireless communications system, the method comprising:
   receiving a request for a current location of a mobile station in a mobile communication system, the request being received from an application configured to provide location dependent services;
   determining an elapsed time since a last known location of the mobile station was determined;
   comparing the elapsed time to a threshold time limit; and
   in response to the comparing:
   a) if the elapsed time is within the threshold time limit, providing to the application, as the current location, the last known location, without contacting the mobile station; and
   b) if the elapsed time is not within the threshold time limit, determining a current location of the mobile station and providing to the application, as the current location, the obtained current location,
   wherein the comparing is performed responsive to a signal indicating the status of the mobile station,
   wherein, responsive to said signal indicating that the mobile station is active, the comparing is disabled and a current location is determined for the mobile station, and
   wherein, responsive to said signal indicating that the mobile station is idle, the comparing is enabled.

2. A method according to claim 1 further comprising:
   determining a current location of the mobile station if the time is not within the threshold limit; and
   providing, as the current location, the obtained current location.

3. A method according to claim 1 wherein the comparing the time to the threshold time limit is dependent upon the status of the mobile station.

4. A method according to claim 3 wherein if the mobile station is active the comparing is disabled and a current location is determined for the mobile station.

5. A method according to claim 3 wherein if the status of the mobile station is idle, the comparing is enabled.

6. A method according to claim 2, wherein if a current location is not provided, the last known location is provided as the current location.

7. A method according to claim 1 further comprising storing the last known location of a mobile station together with a time associated with the last known location.

8. A method according to claim 1 further comprising storing the threshold time limit.

9. A method according to claim 1 further comprising dynamically adjusting the threshold time limit.

10. A method according to claim 1 wherein the threshold time limit is set by a network operator.

11. A method according to claim 1 wherein the threshold limit is included in the request for the current location.

12. A method according to claim 1 wherein the time is an elapsed time.

13. A method in a wireless communications system, the method comprising:
  receiving at a network element a request from an application for a current location of a mobile station, the request being received from an application configured to provide location dependent services;
  determining, at the network element, an elapsed time since a last known location of the mobile station was determined;
  comparing, at the network element, the elapsed time to a threshold time limit; and,
  in response to the comparing:
    a) if the elapsed time is within the threshold time limit, providing to the application, as the current location, the last known location, without contacting the mobile station; and
    b) if the elapsed time is not within the threshold time limit, determining a current location of the mobile station and providing to the application, as the current location, the obtained current location,
  wherein the comparing is performed responsive to a signal indicating the status of the mobile station,
  wherein, responsive to said signal indicating that the mobile station is active, the comparing is disabled and a current location is determined for the mobile station, and
  wherein, responsive to said signal indicating that the mobile station is idle, the comparing is enabled.

14. An apparatus in a wireless communications system, the apparatus comprising:
  receiving means for receiving a request for a current location of a mobile station in a mobile communication system, the request being received from an application configured to provide location dependent services;
  determining means for determining an elapsed time since a last known location of the mobile station was determined;
  comparing means for comparing the elapsed time to a threshold time limit;
  providing means for providing to the application, as the current location, the last known location, if the elapsed time is within the threshold time limit without contacting the mobile station; and
  means for determining a current location of the mobile station and means for providing to the application, as the current location, the obtained current location, if the elapsed time is not within the threshold time limit,
  wherein the comparing means is responsive to a signal indicating the status of the mobile station,
  wherein, responsive to said signal indicating that the mobile station is active, the comparing means is disabled and a current location is determined for the mobile station, and
  wherein, responsive to said signal indicating that the mobile station is idle, the comparing means is enabled.

15. The apparatus according to claim 14, further comprising means for determining a current location for the mobile station if the time is not within the threshold limit; wherein the means for providing is adapted to provide, as the current location, the obtained current location.

16. The apparatus according to claim 14, wherein the means for comparing the time to the threshold time limit is responsive to a signal indicating the status of the mobile station.

17. The apparatus according to claim 16, wherein, responsive to said signal indicating that the mobile station is active, the comparing means is disabled and a current location is determined for the mobile station.

18. The apparatus according to claim 16, wherein, responsive to said signal indicating that the mobile station is idle, the comparing means is enabled.

19. The apparatus according to claim 15, wherein if a current location is not provided, the network element is adapted to provide the last known location is provided as the current location.

20. The apparatus according to claim 14, further comprising means for storing the last known location of a mobile station together with a time associated with the last known location.

21. The apparatus according to claim 14, further comprising means for storing the threshold time limit.

22. The apparatus according to claim 14, further comprising means for dynamically adjusting the threshold time limit.

23. The apparatus according to claim 14, wherein the threshold time limit is set by a network operator.

24. The apparatus according to claim 14, wherein the threshold time limit is included in the request for a current location.

25. A mobile communication system comprising:
  an application configured to provide location dependent services and to generate a location request for a user equipment;
  a network element configured to receive the request for a current location of a mobile station;
  a network element configured to determine an elapsed time since a last known location of the mobile station was determined and to compare the elapsed time to a threshold time limit;
  a network element configured to provide, as the current location, in response to said comparing, the last known location, without contacting the said mobile station, if the elapsed time is within the threshold time limit; and
  a network element configured to determine a current location of the mobile station and to provide to the application, as the current location, in response to said comparing, the obtained current location, if the elapsed time is not within the threshold time limit,
  wherein the comparing is performed responsive to a signal indicating the status of the mobile station,
  wherein, responsive to said signal indicating that the mobile station is active, the comparing is disabled and a current location is determined for the mobile station, and
  wherein, responsive to said signal indicating that the mobile station is idle, the comparing is enabled.

26. A mobile communication system according to claim 25, wherein the network element for determining the time at which the last known location was determined includes a visitor location register.

27. A mobile communication system according to claim 25 wherein the system implements a customized applications for mobile network enhanced logic (CAMEL) framework.

28. A mobile communication system according to claim 25 wherein the system implements location services.

29. An apparatus in a wireless communications system, the apparatus comprising:
  a receiver configured to receive a request for a current location of a mobile station in a mobile communication system, the request being received from an application configured to provide location dependent services;
  a calculator configured to determine an elapsed time since a last known location of the mobile station was determined;

a comparator configured to compare the elapsed time to a threshold time limit;

a register configured to provide to the application, as the current location, in response to the comparing, the last known location if the elapsed time is within the threshold time limit, without contacting the mobile station; and a determining unit configured to determine a current location of the mobile station and a providing unit configured to provide to the application, as the current location, in response to the comparing, the obtained current location, if the elapsed time is not within the threshold time limit, wherein the comparator is responsive to a signal indicating the status of the mobile station, wherein, responsive to said signal indicating that the mobile station is active, the comparator is disabled and a current location is determined for the mobile station, and wherein, responsive to said signal indicating that the mobile station is idle, the comparator is enabled.

30. The apparatus according to claim 29, further comprising a determining unit configured to determine a current location for the mobile station if the time is not within the threshold limit; wherein the providing unit is configured to provide, as the current location, the obtained current location.

31. The apparatus according to claim 30, wherein if a current location is not provided, the network element is configured to provide the last known location as the current location.

32. The apparatus according to claim 29, further comprising storage configured to store the last known location of a mobile station together with a time associated with the last known location.

33. The apparatus according to claim 29, further comprising storage configured to store the threshold time limit.

34. The apparatus according to claim 29, further comprising an adjusting unit configured to dynamically adjust the threshold time limit.

35. The apparatus according to claim 29, wherein the threshold time limit is set by a network operator.

36. The apparatus according to claim 29, wherein the threshold time limit is included in the request for a current location.

37. The apparatus according to claim 14, further comprising means for receiving the threshold limit with the request for the current location.

38. The system according to claim 25, further comprising means for receiving the threshold limit with the request for the current location.

39. The system according to claim 25, further comprising means for storing the threshold time limit.

40. The system according to claim 25, further comprising means for dynamically adjusting the threshold time limit.

41. The system according to claim 25, wherein the threshold time limit is set by a network operator.

* * * * *